United States Patent
Sharma et al.

(10) Patent No.: US 12,436,711 B2
(45) Date of Patent: Oct. 7, 2025

(54) PROVIDING FINE GRAIN ACCESS TO PACKAGE MEMORY

(71) Applicant: Intel Corporation, Santa Clara, CA (US)

(72) Inventors: Abhishek Anil Sharma, Portland, OR (US); Wilfred Gomes, Portland, OR (US); Rajabali Koduri, Saratoga, CA (US); Pushkar Ranade, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 17/708,398

(22) Filed: Mar. 30, 2022

(65) Prior Publication Data
US 2023/0315334 A1 Oct. 5, 2023

(51) Int. Cl.
*G06F 3/06* (2006.01)
*G06F 12/1027* (2016.01)

(52) U.S. Cl.
CPC .......... *G06F 3/0656* (2013.01); *G06F 3/0604* (2013.01); *G06F 3/0673* (2013.01); *G06F 12/1027* (2013.01); *G06F 2212/68* (2013.01)

(58) Field of Classification Search
CPC .... G06F 3/0604; G06F 3/0656; G06F 3/0673; G06F 12/1027; G06F 12/0284; G06F 12/109; G06F 12/0813; G06F 12/1045; G06F 12/0811; G06F 2212/68; G06F 2212/1024; G06F 2212/1041; G06F 2212/657; G06F 13/1673; G11C 7/10
See application file for complete search history.

(56) References Cited

U.S. PATENT DOCUMENTS

| | | | |
|---|---|---|---|
| 9,734,079 B2 * | 8/2017 | Feekes | G06F 12/063 |
| 10,990,530 B1 * | 4/2021 | Chanler | G06F 12/0895 |
| 2013/0141858 A1 * | 6/2013 | Pyeon | G06F 1/203 361/679.31 |
| 2021/0074695 A1 | 3/2021 | Gomes et al. | |
| 2021/0225808 A1 | 7/2021 | Bohr et al. | |
| 2021/0375849 A1 | 12/2021 | Gomes et al. | |

OTHER PUBLICATIONS

U.S. Appl. No. 17/708,417, filed Mar. 30, 2022, entitled "Scalable Architecture for Multi-Die Semiconductor Packages," by Abhishek Anil Sharma, et al., 24 pgs.
U.S. Appl. No. 17/850,044, filed Jun. 27, 2022, entitled "Reconfigurable Vector Processing in a Memory," by Abhishek Anil Sharma, et al., 31 pgs.
U.S. Appl. No. 17/850,090, filed Jun. 27, 2022, entitled "Performing Distributed Processing Using Distributed Memory," by Abhishek Anil Sharma, et al., 29 pgs.

* cited by examiner

Primary Examiner — Khoa D Doan
(74) Attorney, Agent, or Firm — Nicholson De Vos Webster & Elliott LLP

(57) ABSTRACT

In one embodiment, an integrated circuit package includes: a first die having a plurality of cores, each of the plurality of cores having a local memory interface circuit to access a local portion of a dynamic random access memory (DRAM); and a second die comprising the DRAM, where at least some of the plurality of cores are directly coupled to a corresponding local portion of the DRAM by a stacking of the first die and the second die. Other embodiments are described and claimed.

13 Claims, 8 Drawing Sheets

PROVIDING FINE GRAIN ACCESS TO PACKAGE MEMORY

BACKGROUND

Modern semiconductor packaging techniques often seek to increase the number of die-to-die connections. Conventional techniques implement a so-called 2.5D solution, utilizing a silicon interposer and through silicon vias (TSVs) to connect die using interconnects with a density and speed typical for integrated circuits in a minimal footprint. However, there are complexities in layout and manufacturing techniques. Further, when seeking to embed a memory die in a common package, there can be latencies owing to separation between consuming resources and the memory die as they may be separated from each other by adaptation on different portions of the silicon interposer.

DETAILED DESCRIPTION

In various embodiments, an integrated circuit (IC) package may include multiple dies in stacked relation. More particularly in embodiments, at least one compute die may be adapted on a memory die in a manner to provide fine-grained memory access by way of localized dense connectivity between compute elements of the compute die and localized banks (or other local portions) of the memory die. This close physical coupling of compute elements to corresponding local portions of the memory die enables the compute elements to locally access local memory portions, in contrast to a centralized memory access system that is conventionally implemented via a centralized memory controller.

Figure 1:
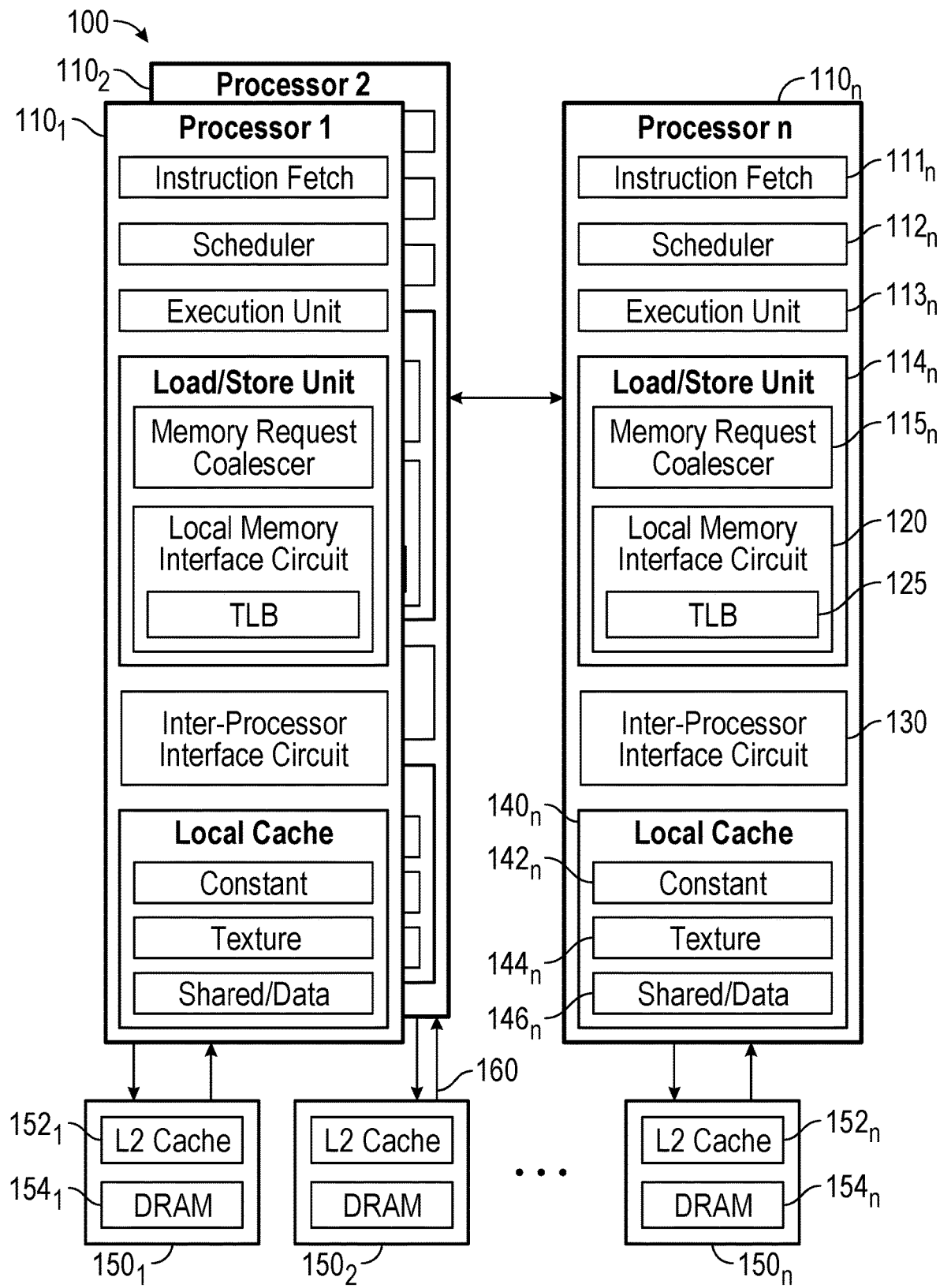
FIG. 1 is a block diagram of a package having memory tightly coupled with processing circuitry in accordance with an embodiment.

Referring now to FIG. 1, shown is a block diagram of a package having memory tightly coupled with processing circuitry in accordance with an embodiment. As shown in FIG. 1, package 100 includes a plurality of processors $110_1$-$110_n$. In the embodiment shown, processors 110 are implemented as streaming processors. However embodiments are not limited in this regard, and in other cases the processors may be implemented as general-purpose processing cores, accelerators such as specialized or fixed function units or so forth. As used herein, the term "core" refers generally to any type of processing circuitry that is configured to execute instructions, tasks and/or workloads, namely to process data.

In the embodiment of FIG. 1, processors 110 each individually couple directly to corresponding portions of a memory 150, namely memory portions $150_1$-$150_n$. As such, each processor 110 directly couples to a corresponding local portion of memory 150 without a centralized interconnection network therebetween. In one or more embodiments described herein, this direct coupling may be implemented by stacking multiple die within package 100. For example, processors 110 may be implemented on a first die and memory 150 may be implemented on at least one other die, where these dies may be stacked on top of each other, as will be described more fully below. By "direct coupling" it is meant that a processor (core) is physically in close relation to a local portion of memory in a non-centralized arrangement so that the processor (core) has access only to a given local memory portion and without communicating through a memory controller or other centralized controller.

As seen, each instantiation of processor 110 may directly couple to a corresponding portion of memory 150 via interconnects 160. Although different physical interconnect structures are possible, in many cases, interconnects 160 may be implemented by one or more of conductive pads, bumps or so forth. Each processor 115 may include TSVs that directly couple to TSVs of a corresponding local portion of memory 150. In such arrangements, interconnects 160 may be implemented as bumps or hybrid bonding or other bumpless technique.

Memory 150 may, in one or more embodiments, include a level 2 (L2) cache 152 and a dynamic random access memory (DRAM) 154. As illustrated, each portion of memory 150 may include one or more banks or other portions of DRAM 154 associated with a corresponding processor 110. In one embodiment, each DRAM portion 154 may have a width of at least 1024 words. Of course other widths are possible. Also while a memory hierarchy including both an L2 cache and DRAM is shown in FIG. 1, it is possible for an implementation to provide only DRAM 154 without the presence of an L2 cache (at least within memory 150). This is so, as DRAM 154 may be configured to operate as a cache, as it may provide both spatial and temporal locality for data to be used by its corresponding processor 110. This is particularly so when package 100 is included in a system having a system memory (e.g., implemented as dual-inline memory modules (DIMMs) or other volatile or non-volatile memory). In other cases, such as a DRAM-less system, there may be multiple memory dies, including at least one die having local memory portions in accordance with an embodiment, and possibly one or more other memory die having conventional DRAM to act as at least a portion of a system memory. As an example, one memory die may be configured as a cache memory and another memory die may be configured as a system memory. In such DRAM-less system, DRAM 154 may be a system memory for the system in which package 100 is included.

With embodiments, package 100 may be implemented within a given system implementation, which may be any type of computing device that is a shared DRAM-less system, by using memory 150 as a flat memory hierarchy. Such implementations may be possible, given the localized dense connectivity between corresponding processors 110 and memory portions 150 that may provide for dense local access on a fine-grained basis. In this way, such implementations may rely on physically close connections to localized memories 150, rather than a centralized access mechanism, such as a centralized memory controller of a processor. Further, direct connection occurs via interconnects 160 without a centralized interconnection network.

Still with reference to FIG. 1, each processor 110 may include an instruction fetch circuit 111 that is configured to fetch instructions and provide them to a scheduler 112. Scheduler 112 may be configured to schedule instructions for execution on one or more execution circuits 113, which may include arithmetic logic units (ALUs) and so forth to perform operations on data in response to decoded instructions, which may be decoded in an instruction decoder, either included within processor 110 or elsewhere within an SoC or another processor.

As further shown in FIG. 1, processor 110 also may include a load/store unit 114 that includes a memory request coalescer 115. Load/store unit 114 may handle interaction with corresponding local memory 150. To this end, each processor 110 further may include a local memory interface circuit 120 that includes a translation lookaside buffer (TLB) 125. In other implementations local memory interface circuit 120 may be separate from load/store unit 114.

In embodiments herein, TLB 125 may be configured to operate on only a portion of an address space, namely that portion associated with its corresponding local memory 150. To this end, TLB 125 may include data structures that are configured for only such portion of an entire address space. For example, assume an entire address space is 64 bits corresponding to a 64-bit addressing scheme. Depending upon a particular implementation and sizing of an overall memory and individual memory portions, TLB 125 may operate on somewhere between approximately 10 and 50 bits.

Still with reference to FIG. 1, each processor 110 further includes a local cache 140 which may be implemented as a level 1 (L1) cache. Various data that may be frequently and/or recently used within processor 110 may be stored within local cache 140. In the illustration of FIG. 1, exemplary specific data types that may be stored within local cache 140 include constant data 142, texture data 144, and shared/data 146. Note that such data types may be especially appropriate when processor 110 is implemented as a graphics processing unit (GPU). Of course other data types may be more appropriate for other processing circuits, such as general-purpose processing cores or other specialized processing units.

Still referring to FIG. 1, each processor 110 may further include an inter-processor interface circuit 130. Interface circuit 130 may be configured to provide communication between a given processor 110 and its neighboring processors, e.g., a nearest neighbor on either side of processor 130. Although embodiments are not limited in this regard, in one or more embodiments inter-processor interface circuit 130 may implement a message passing interface (MPI) to provide communication between neighboring processors. While shown at this high level in the embodiment of FIG. 1, many variations and alternatives are possible. For example, more dies may be present in a given package, including multiple memory dies that form one or more levels of a memory hierarchy and additional compute, interface, and/or controller dies.

Figure 2:
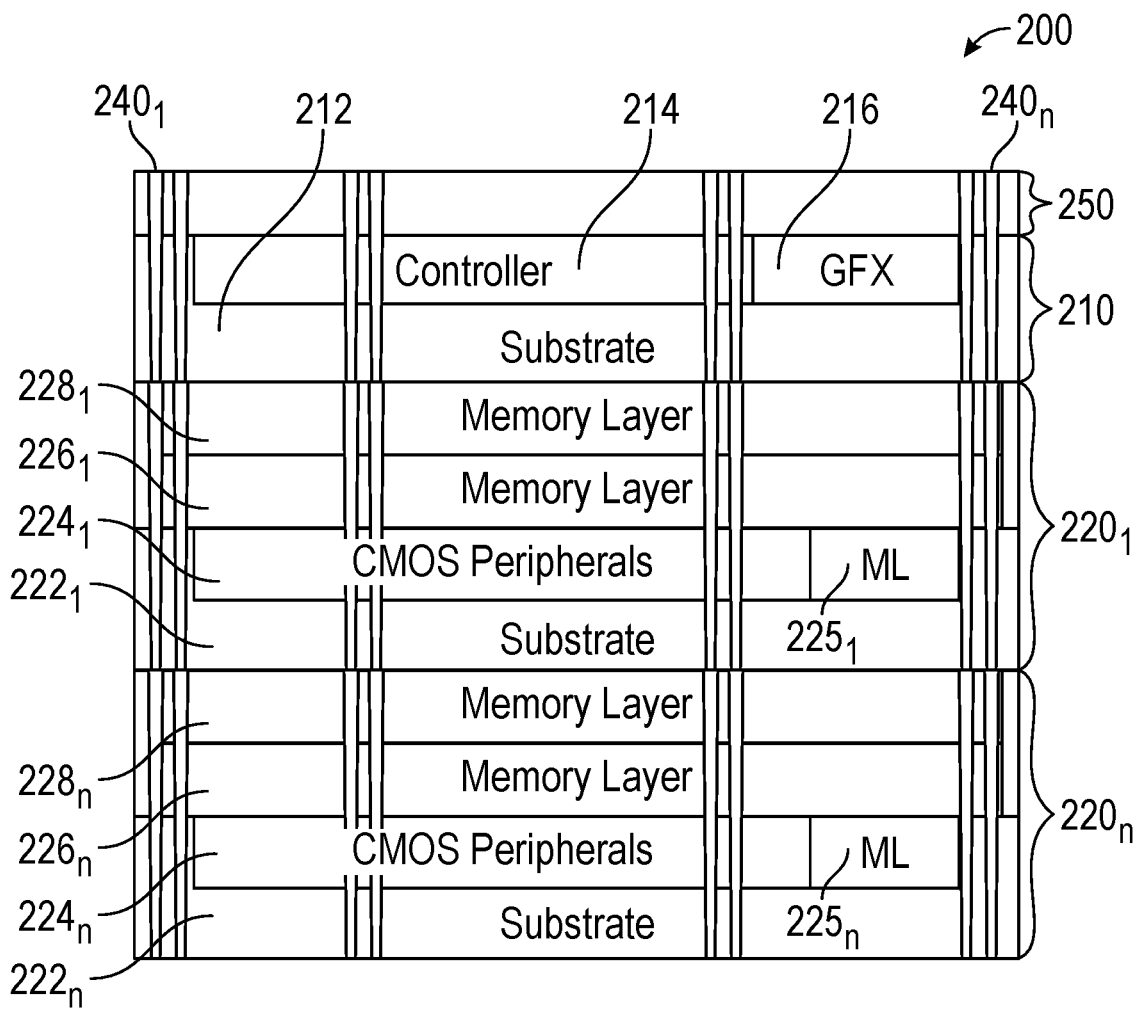
FIG. 2 is a cross sectional view of a package in accordance with an embodiment.

Referring now to FIG. 2, shown is a cross sectional view of a package in accordance with an embodiment. As shown in FIG. 2, package 200 is a multi-die package including a set of stacked die, namely a first die 210, which may be a compute die and multiple memory die 220₁ and 220₂. With this stacked arrangement, compute die 210 may be stacked above memory die 220 such that localized dense connectivity is realized between corresponding portions of memory die 220 and compute die 210. As further illustrated, a package substrate 250 may be present onto which the stacked dies may be adapted. In an embodiment, compute die 210 may be adapted at the top of the stack to improve cooling.

As further illustrated in FIG. 2, physical interconnection between circuitry present on the different die may be realized by TSVs $240_1$-$240_n$ (each of which may be formed of independent TSVs of each die). In this way, individual memory cells of a given portion may be directly coupled to circuitry present within compute die 210. Note further that in FIG. 2, in the cross-sectional view, only circuitry of a single processing circuit and a single memory portion is illustrated. As shown, with respect to compute die 210, a substrate 212 is provided in which controller circuitry 214 and graphics circuitry 216 is present.

With reference to memory die 220, a substrate 222 is present in which complementary metal oxide semiconductor (CMOS) peripheral circuitry 224 may be implemented, along with memory logic (ML) 225, which may include localized memory controller circuitry and/or cache controller circuitry. In certain implementations, CMOS peripheral circuitry 224 may include encryption/decryption circuitry, in-memory processing circuitry or so forth. As further illustrated, each memory die 220 may include multiple layers of memory circuitry. In one or more embodiments, there may be a minimal distance between CMOS peripheral circuitry 224 and logic circuitry (e.g., controller circuitry 214 and graphics circuitry 216) of compute die 210, such as less than one micron.

As shown, memory die 220 may include memory layers 226, 228. While shown with two layers in this example, understand that more layers may be present in other implementations. In each layer, a plurality of bit cells may be provided, such that each portion of memory die 220 provides a locally dense full width storage capacity for a corresponding locally coupled processor. Note that memory die 220 may be implemented in a manner in which the memory circuitry of layers 226, 228 may be implemented with backend of line (BEOL) techniques. While shown at this high level in FIG. 2, many variations and alternatives are possible.

Figure 3A:
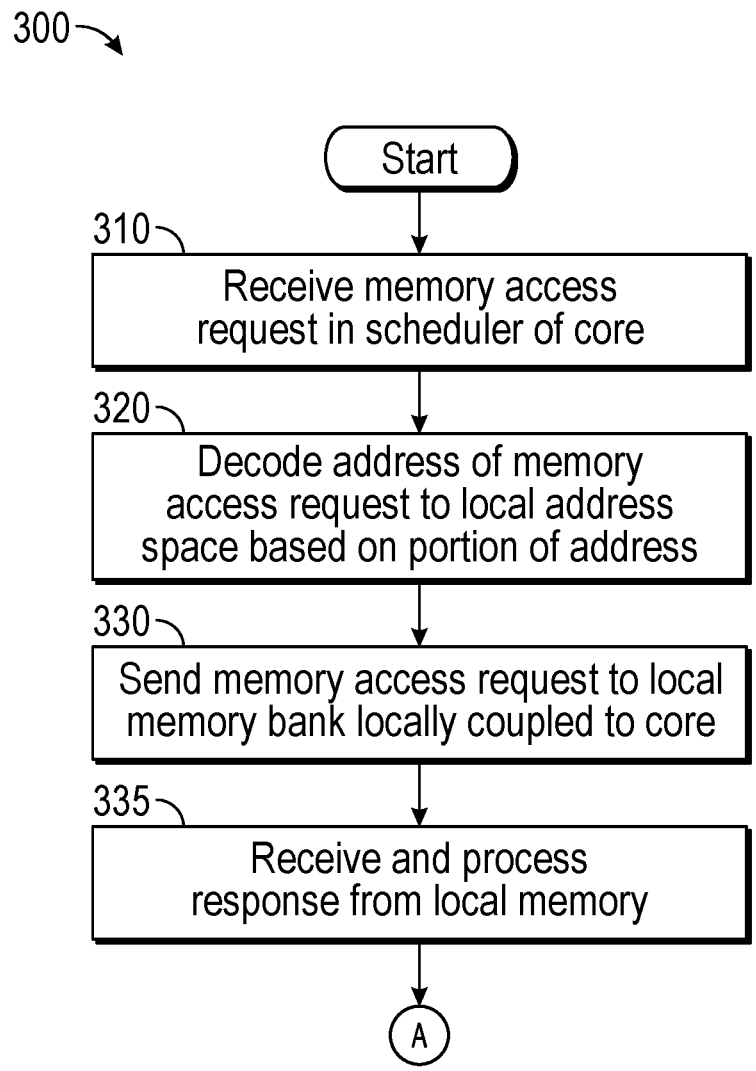
FIGS. 3A/B is a flow diagram of a method in accordance with an embodiment.
Figure 3B:
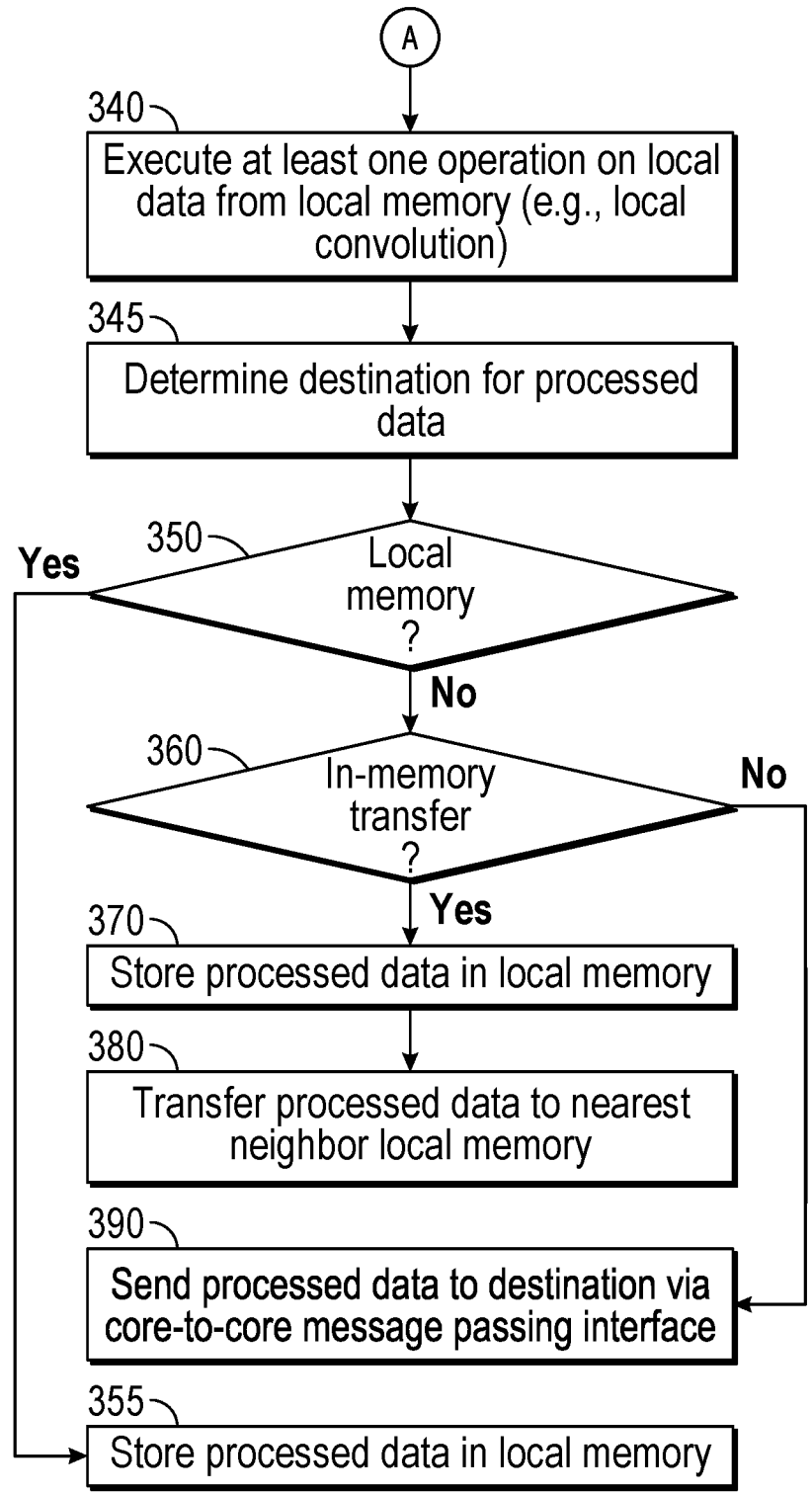

Referring now to FIGS. 3A and 3B, shown is a flow diagram of a method for using a memory configuration in accordance with an embodiment. Method 300 may be performed in hardware circuitry present within stacked die of a package as described herein alone and/or in combination with firmware and/or software.

As illustrated, method 300 begins by receiving a memory access request in a scheduler of a core (block 310). This request may come from a central controller of a system and may be a processing task such as performing a local convolution on data stored in a local memory. As such, the request may trigger generation of a memory access request, e.g., a read request. Next at block 320, the address of the memory access request may be decoded to the local address space. This decoding may be performed at least in part by a TLB that uses a portion of an overall address space, e.g., a configurable number of address bits that it may process through its page tables or other data structures to determine the location of requested data. Next at block 330, the memory access request may be sent to the local memory bank that is locally coupled to the core. As discussed above, this communication may be using local connections.

Still with reference to FIG. 3A, assuming that the memory access request is a read request, optional block 335 may occur in which a response from the local memory is received and processed, namely a completion or other return of the data to provide the requested data to the local processor.

Flow proceeds to FIG. 3B, which shows various operations that may be performed at least in part within a local processor. As illustrated in FIG. 3B, method 300 may continue by executing at least one operation on the local data from the local memory (block 340). As one example, this local operation may be a local convolution. Next at block 345, a destination for the processed data may be determined. For example, the incoming request may indicate whether the destination is back to the local memory or to another location. Control next passes to diamond 350 to determine whether the destination is the local memory. If so, control passes to block 355, where the processed data may be stored back to the local memory, e.g., to the same location from which the original data was obtained by way of the localized connections.

Still with reference to FIG. 3B, instead if it is determined at diamond 350 that the destination is not the local memory, control next passes to diamond 360 to determine whether an in-memory transfer is to occur. If so, control passes to block 370 where the processed data may be stored in the local memory (such as discussed above at block 355). Then at block 380, the processed data may be transferred from the local memory region to a nearest neighbor local memory region. For example, this nearest neighbor local memory region may be associated with another processor that is to perform another task on the processed data. Otherwise if an in-memory transfer is not to occur, control instead passes from diamond 360 to block 390 where the data may be sent to a destination via a core-to-core message passing interface. Thus in this way, the processed data may be provided to a nearest neighbor core that is to further process the data. Understand while shown at this high level in the embodiment of FIG. 3A/3B, many variations and alternatives are possible.

Packages in accordance with embodiments can be incorporated in many different system types, ranging from small portable devices such as a smartphone, laptop, tablet or so forth, to larger systems including client computers, server computers and datacenter systems.

Figure 4:
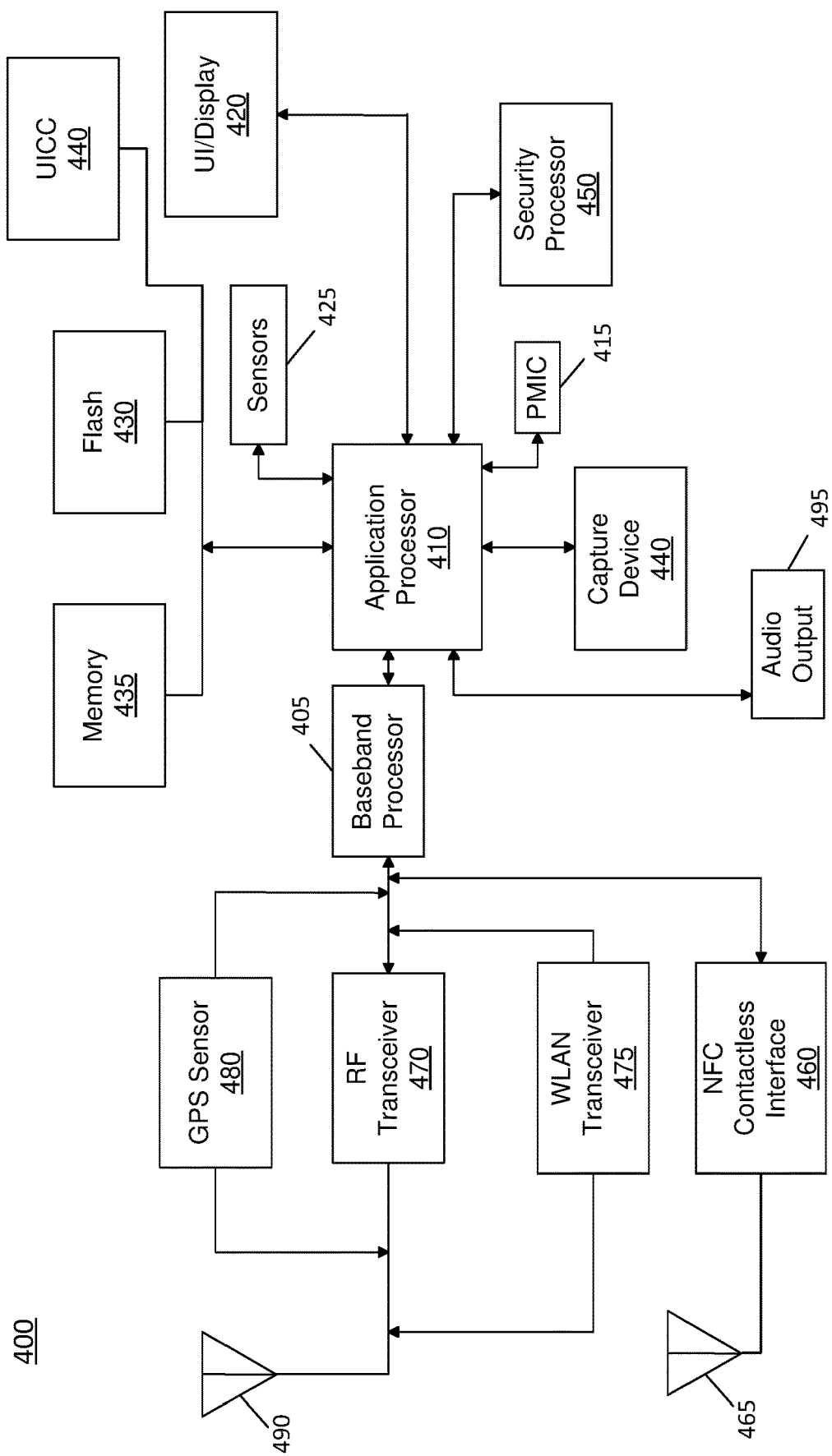
FIG. 4 is a block diagram of an example system with which embodiments can be used.

Referring now to FIG. 4, shown is a block diagram of an example system with which embodiments can be used. As seen, system 400 may be a smartphone or other wireless communicator. A baseband processor 405 is configured to perform various signal processing with regard to communication signals to be transmitted from or received by the system. In turn, baseband processor 405 is coupled to an application processor 410, which may be a main CPU of the system to execute an OS and other system software, in addition to user applications such as many well-known social media and multimedia apps. Application processor 410 may further be configured to perform a variety of other computing operations for the device.

In turn, application processor 410 can couple to a user interface/display 420, e.g., a touch screen display. In addition, application processor 410 may couple to a memory system including a non-volatile memory, namely a flash memory 430 and a system memory, namely a dynamic random access memory (DRAM) 435. In embodiments herein, a package may include multiple dies including at least processor 410 and DRAM 435, which may be stacked and configured as described herein. As further seen, application processor 410 further couples to a capture device 440 such as one or more image capture devices that can record video and/or still images.

Still referring to FIG. 4, a universal integrated circuit card (UICC) 440 comprising a subscriber identity module and possibly a secure storage and cryptoprocessor is also coupled to application processor 410. System 400 may further include a security processor 450 that may couple to application processor 410. A plurality of sensors 425 may couple to application processor 410 to enable input of a variety of sensed information such as accelerometer and other environmental information. An audio output device 495 may provide an interface to output sound, e.g., in the form of voice communications, played or streaming audio data and so forth.

As further illustrated, a near field communication (NFC) contactless interface 460 is provided that communicates in a NFC near field via an NFC antenna 465. While separate antennae are shown in FIG. 4, understand that in some implementations one antenna or a different set of antennae may be provided to enable various wireless functionality.

Figure 5:
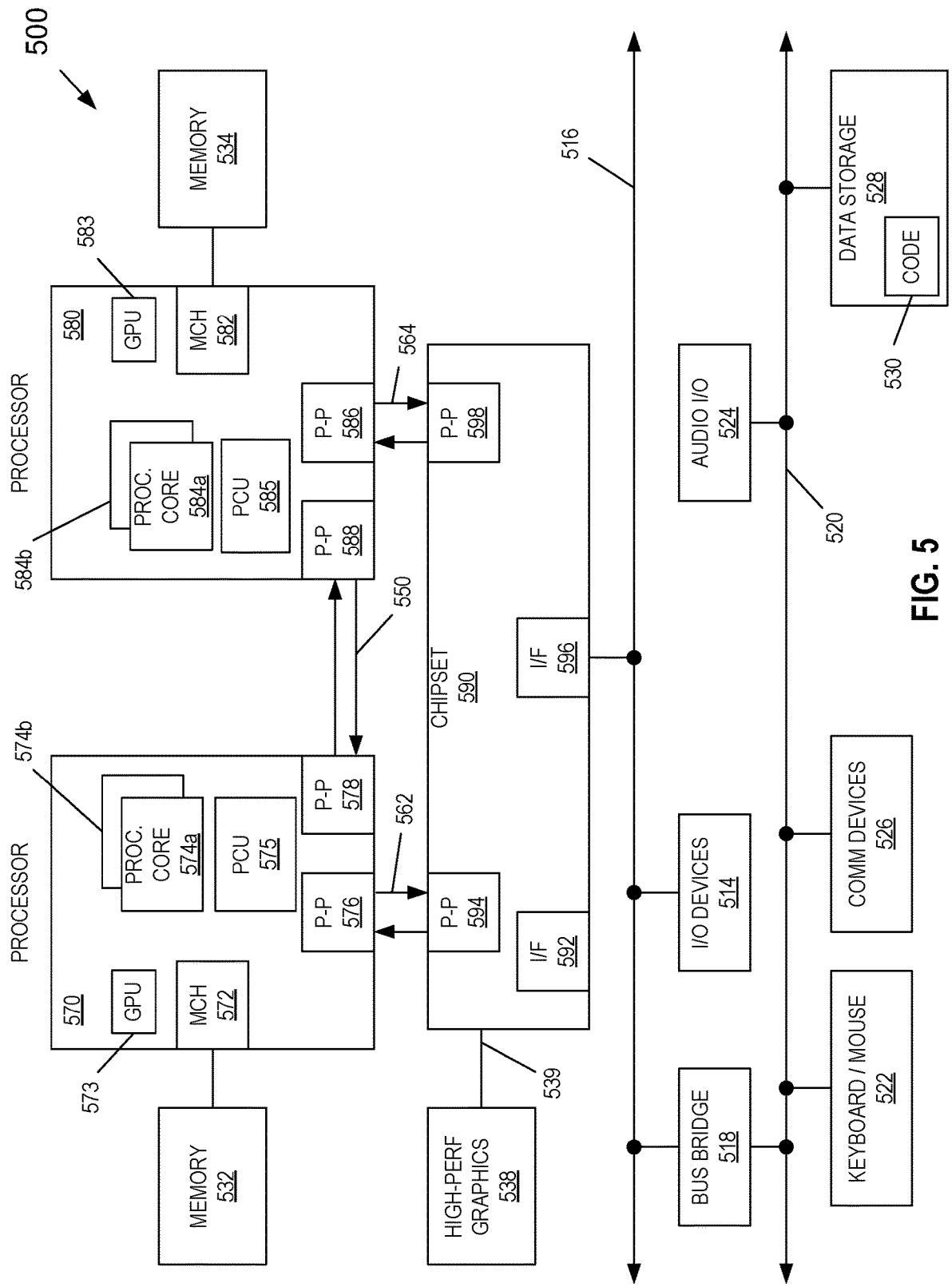
FIG. 5 is a block diagram of a system in accordance with another embodiment.

Embodiments may be implemented in other system types such as client or server systems. Referring now to FIG. 5, shown is a block diagram of a system in accordance with another embodiment. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processors 574a and 574b and processor cores 584a and 584b), although potentially many more cores may be present in the processors. In addition, each of processors 570 and 580 also may include a graphics processor unit (GPU) 573, 583 to perform graphics operations. Each of the processors can include a power control unit (PCU) 575, 585 to perform processor-based power management.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of system memory (e.g., DRAM) locally attached to the respective processors. In embodiments herein, one or more packages may include multiple dies including at least processor 570 and memory 532 (e.g.), which may be stacked and configured as described herein.

First processor 570 and second processor 580 may be coupled to a chipset 590 via P-P interconnects 562 and 564, respectively. As shown in FIG. 5, chipset 590 includes P-P interfaces 594 and 598. Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Figure 6:
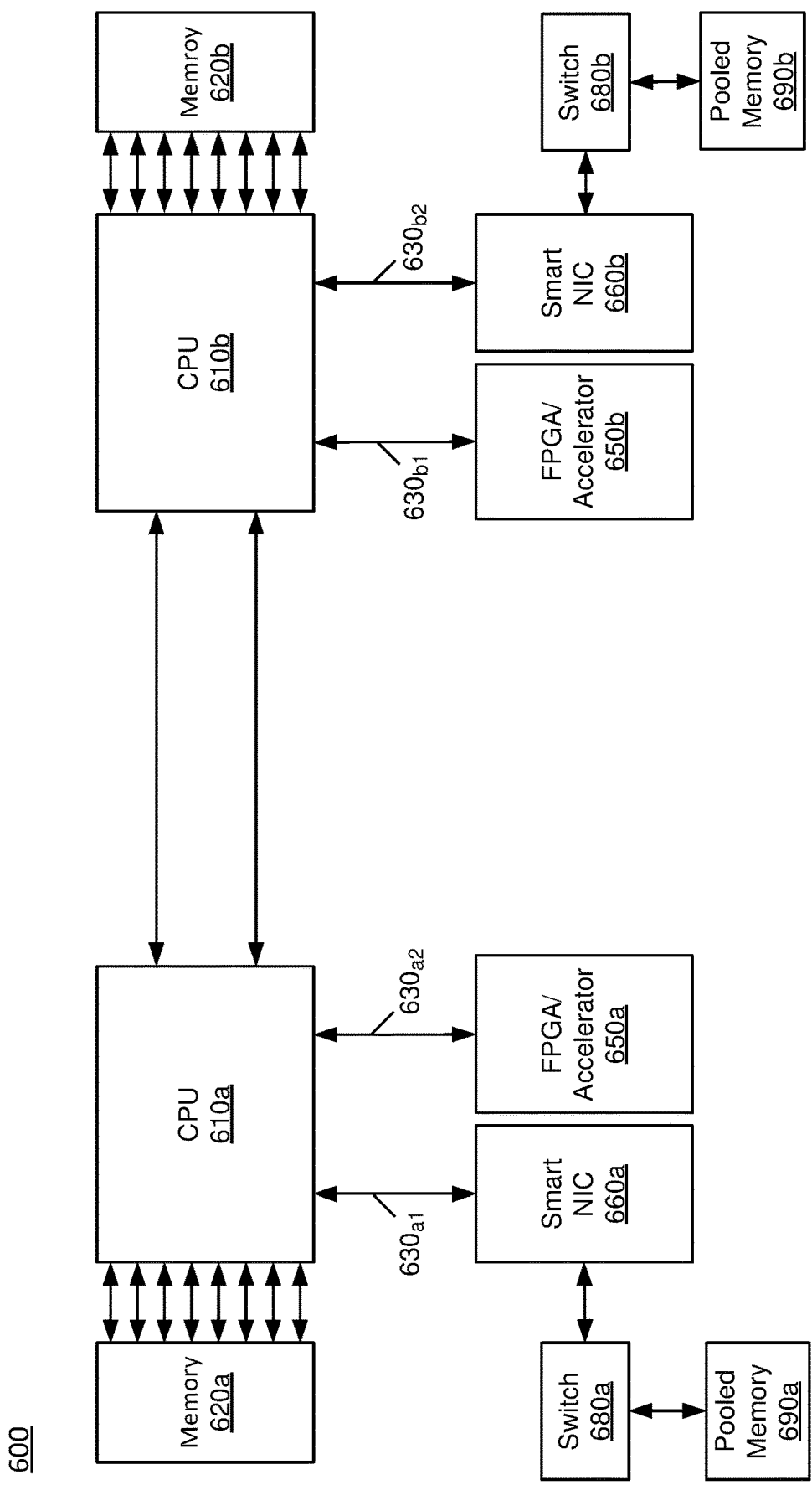
FIG. 6 is a block diagram of a system in accordance with another embodiment.

Referring now to FIG. 6, shown is a block diagram of a system 600 in accordance with another embodiment. As shown in FIG. 6, system 600 may be any type of computing device, and in one embodiment may be a datacenter system. In the embodiment of FIG. 6, system 600 includes multiple CPUs 610a,b that in turn couple to respective system memories 620a,b which in embodiments may be implemented as double data rate (DDR) memory, persistent or other types of memory. Note that CPUs 610 may couple together via an interconnect system 615 implementing a coherency protocol. In embodiments herein, one or more packages may include multiple dies including at least CPU 610 and system memory 620 (e.g.), which may be stacked and configured as described herein.

To enable coherent accelerator devices and/or smart adapter devices to couple to CPUs 610 by way of potentially multiple communication protocols, a plurality of interconnects 630a1-b2 may be present.

In the embodiment shown, respective CPUs 610 couple to corresponding field programmable gate arrays (FPGAs)/ accelerator devices 650a,b (which may include GPUs, in one embodiment). In addition CPUs 610 also couple to smart NIC devices 660a,b. In turn, smart NIC devices 660a,b couple to switches 680a,b that in turn couple to a pooled memory 690a,b such as a persistent memory.

Figure 7:
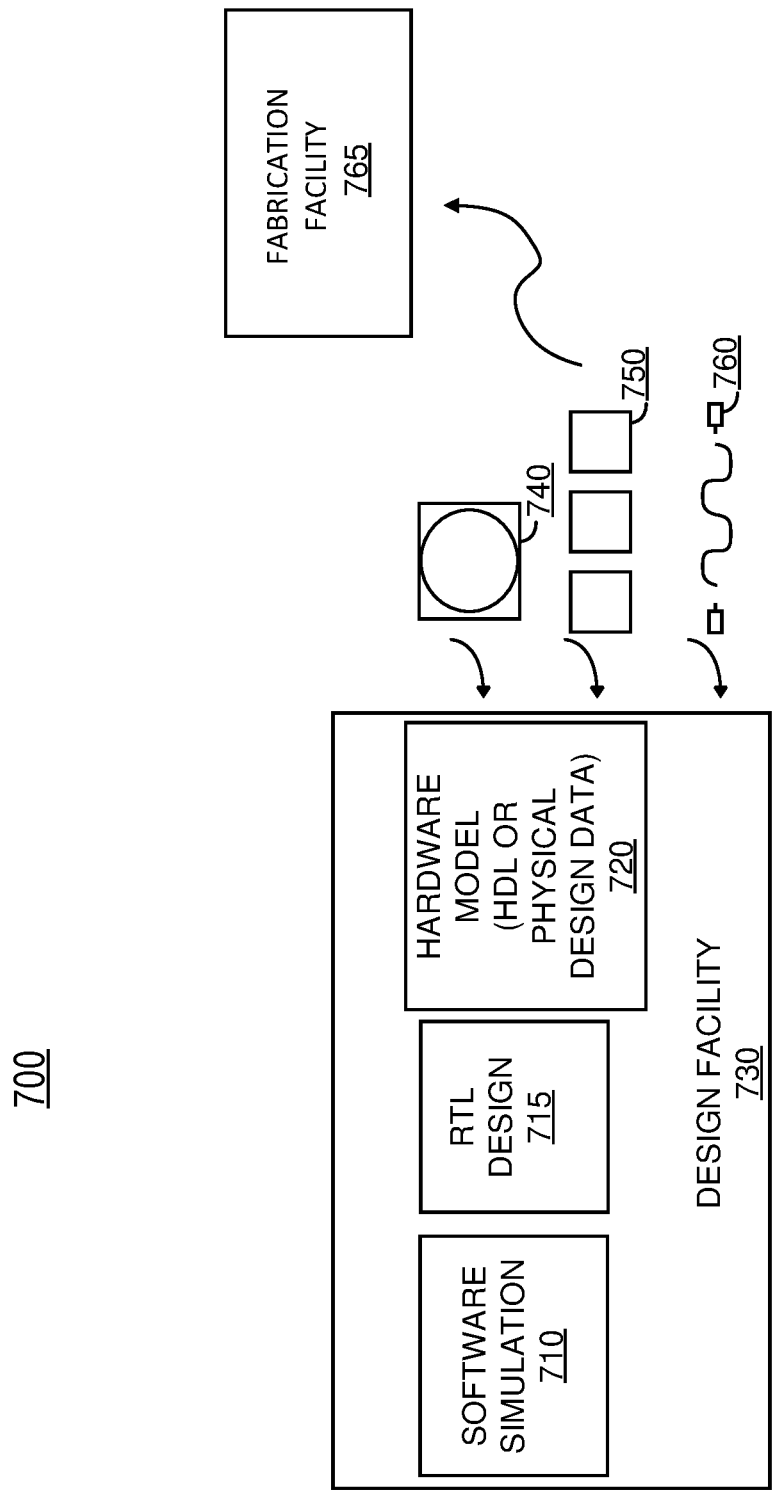
FIG. 7 is a block diagram illustrating an IP core development system used to manufacture an integrated circuit to perform operations according to an embodiment.

FIG. 7 is a block diagram illustrating an IP core development system 700 that may be used to manufacture integrated circuit dies that can in turn be stacked to realize multi-die packages according to an embodiment. The IP core development system 700 may be used to generate modular, re-usable designs that can be incorporated into a larger design or used to construct an entire integrated circuit (e.g., an SoC integrated circuit). A design facility 730 can generate a software simulation 710 of an IP core design in a high level programming language (e.g., C/C++). The software simulation 710 can be used to design, test, and verify the behavior of the IP core. A register transfer level (RTL) design can then be created or synthesized from the simulation model. The RTL design 715 is an abstraction of the behavior of the integrated circuit that models the flow of digital signals between hardware registers, including the associated logic performed using the modeled digital signals. In addition to an RTL design 715, lower-level designs at the logic level or transistor level may also be created, designed, or synthesized. Thus, the particular details of the initial design and simulation may vary.

The RTL design 715 or equivalent may be further synthesized by the design facility into a hardware model 720, which may be in a hardware description language (HDL), or some other representation of physical design data. The HDL may be further simulated or tested to verify the IP core design. The IP core design can be stored for delivery to a third party fabrication facility 765 using non-volatile memory 740 (e.g., hard disk, flash memory, or any non-volatile storage medium). Alternately, the IP core design may be transmitted (e.g., via the Internet) over a wired connection 750 or wireless connection 760. The fabrication facility 765 may then fabricate an integrated circuit that is based at least in part on the IP core design. The fabricated integrated circuit can be configured to be implemented in a package and perform operations in accordance with at least one embodiment described herein.

The following examples pertain to further embodiments.

In one example, an apparatus comprise: a first die having a plurality of cores and a second die. Each of the plurality of cores may comprise: a scheduler to schedule tasks for execution on an execution circuit; the execution circuit to execute the tasks; and a local memory interface circuit to access a local portion of a DRAM. The second die may comprise the DRAM, the DRAM comprising a plurality of local portions, where at least some of the plurality of cores are directly coupled to a corresponding local portion of the DRAM by a stacking of the first die and the second die.

In an example, the at least some of the plurality of cores comprises a TLB to map virtual addresses to physical addresses only for the local portion of the DRAM.

In an example, the TLB is to use a portion of address bits of an address space for the DRAM to map the virtual addresses to the physical addresses only for the local portion of the DRAM.

In an example, the local memory interface circuit is to access only the local portion of the DRAM.

In an example, each of the plurality of local portions of the DRAM has a width of at least 1024 words.

In an example, each of the plurality of cores further comprises an interface circuit to couple the core to a first nearest neighbor core and a second nearest neighbor core.

In an example, the interface circuit is to send first processed data to the first nearest neighbor core, where the first nearest neighbor core is to further process the first processed data.

In an example, the apparatus comprises an integrated circuit package having the first die and the second die, where the DRAM is to be a system memory for a system in which the integrated circuit package is included.

In an example, each of the plurality of cores further comprises a local cache, and where the integrated circuit package comprises a flat memory hierarchy, the flat memory hierarchy having only the local cache and the DRAM.

In an example, the second die comprises: a first layer having a first plurality of memory cells for each of the plurality of portions of the DRAM; and a second layer having a second plurality of memory cells for each of the plurality of portions of the DRAM.

In an example, the at least some of the plurality of cores are directly coupled to the corresponding local portion of the DRAM by a plurality of TSVs.

In another example, a method comprises: receiving, in a scheduler of a first core of a first die of a package, a memory access request, where the package comprises the first die and a second die, the first die stacked on the second die, the first die comprising a plurality of cores, the second die comprising a DRAM having a plurality of local portions, where the first core is stacked on a first local portion of the plurality of local portions; decoding, in the first core, an address of the memory access request to a local address space of the first local portion based on a portion of the address; and sending the memory access request directly from the first core to the first local portion.

In an example, the method further comprises: receiving, in the first core, first data in response to the memory access request; executing at least one operation on the first data in the first core; and sending the processed first data to a destination location.

In an example, the method further comprises sending the processed first data to the first local portion through a first plurality of TSVs of the first die and a second plurality of TSVs of the second die.

In an example, the method further comprises when the destination location is a second core of the plurality of cores, transferring the processed first data from the first local portion to a second local portion associated with the second core, the second local portion being a neighbor local portion to the first local portion and the second core being a neighbor core to the first core.

In an example, the method further comprises when the destination location is a second core of the plurality of cores, sending the processed first data to the second core via a message passing interface, the second core being a neighbor core to the first core.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a package comprises a first die and a second die. The first die may have a plurality of cores, each of the plurality of cores comprising a local memory interface circuit to directly access a local portion of a DRAM, the local memory interface circuit comprising a first plurality of TSVs. The second die may comprise the DRAM, the DRAM comprising a plurality of local portions, each of the plurality of local portions comprising a second plurality of TSVs, where at least some of the plurality of cores are directly coupled to the corresponding local portion of the DRAM by interconnection of the first plurality of TSVs and the second plurality of TSVs.

In an example, the at least some of the plurality of cores comprises a TLB to map virtual addresses to physical addresses only for the local portion of the DRAM with a portion of address bits of an address space for the DRAM.

In an example, the package further comprises a third die comprising a second DRAM, the second DRAM comprising a plurality of second local portions, each of the plurality of second local portions comprising a third plurality of TSVs, where at least some of the plurality of cores are directly coupled to the corresponding second local portion of the second DRAM by interconnection of the first plurality of TSVs and the third plurality of TSVs.

In an example, the second die comprises a cache memory and the third die comprises a system memory, when the package is implemented in a system lacking an external system memory.

In yet another example, an apparatus comprise: first die means having a plurality of core means and second die means. Each of the plurality of core means may comprise: scheduler means for scheduling tasks for execution; means for executing the tasks; local memory interface means for accessing a local portion of DRAM means. The second die means may comprise the DRAM means comprising a plurality of local portions, where at least some of the plurality of core means are directly coupled to a corresponding local portion of the DRAM means by a stacking of the first die means and the second die means.

In an example, the at least some of the plurality of core means comprises a TLB means for mapping virtual addresses to physical addresses only for the local portion of the DRAM means.

In an example, the TLB means is to use a portion of address bits of an address space for the DRAM means for mapping the virtual addresses to the physical addresses only for the local portion of the DRAM means.

In an example, the local memory interface means is to access only the local portion of the DRAM means.

In an example, each of the plurality of local portions of the DRAM means having a width of at least 1024 words.

In an example, each of the plurality of core means further comprises interface means for couple the core means to a first nearest neighbor core means and a second nearest neighbor core means.

In an example, the interface means is to send first processed data to the first nearest neighbor core means, where the first nearest neighbor core means is to further process the first processed data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:
1. An apparatus comprising:
   a first die having a plurality of cores, each of the plurality of cores comprising:
      a scheduler to schedule tasks for execution on an execution circuit;
      the execution circuit to execute the tasks;
      and a local memory interface circuit to access a local portion of a dynamic random access memory (DRAM);
   a second die comprising the DRAM, the DRAM comprising a plurality of local portions, wherein at least some of the plurality of cores are directly coupled to a corresponding local portion of the DRAM by a stacking of the first die and the second die; wherein each of the plurality of cores further comprises an interface circuit to couple the core to a first nearest neighbor core and a second nearest neighbor core, wherein the interface circuit is to store a first processed data in the corresponding local portion of the DRAM, and to send the first processed data to the local memory portion of the first nearest neighbor core, wherein the first nearest neighbor core is to further process the first processed data.

2. The apparatus of claim 1, wherein the at least some of the plurality of cores comprises a translation lookaside buffer (TLB) to map virtual addresses to physical addresses only for the local portion of the DRAM.

3. The apparatus of claim 2, wherein the TLB is to use a portion of address bits of an address space for the DRAM to map the virtual addresses to the physical addresses only for the local portion of the DRAM.

4. The apparatus of claim 1, wherein the local memory interface circuit is to access only the local portion of the DRAM.

5. The apparatus of claim 1, wherein each of the plurality of local portions of the DRAM has a width of at least 1024 words.

6. The apparatus of claim 1, wherein the apparatus comprises an integrated circuit package having the first die and the second die, wherein the DRAM is to be a system memory for a system in which the integrated circuit package is included.

7. The apparatus of claim 6, wherein each of the plurality of cores further comprises a local cache, and wherein the integrated circuit package comprises a flat memory hierarchy, the flat memory hierarchy having only the local cache and the DRAM.

8. The apparatus of claim 1, wherein the second die comprises: a first layer having a first plurality of memory cells for each of the plurality of portions of the DRAM; and a second layer having a second plurality of memory cells for each of the plurality of portions of the DRAM.

9. The apparatus of claim 1, wherein the at least some of the plurality of cores are directly coupled to the corresponding local portion of the DRAM by a plurality of through silicon vias (TSVs).

10. A package comprising:
a first die having a plurality of cores, each of the plurality of cores comprising a local memory interface circuit to directly access a local portion of a dynamic random access memory (DRAM), the local memory interface circuit comprising a first plurality of through silicon vias (TSVs);
and a second die comprising the DRAM, the DRAM comprising a plurality of local portions, each of the plurality of local portions comprising a second plurality of TSVs, wherein at least some of the plurality of cores are directly coupled to the corresponding local portion of the DRAM by interconnection of the first plurality of TSVs and the second plurality of TSVs;
wherein each of the plurality of cores further comprises an interface circuit to couple the core to a first nearest neighbor core and a second nearest neighbor core, wherein the interface circuit is to store a first processed data in the corresponding local portion of the DRAM, and to send the first processed data to the local memory portion of the first nearest neighbor core, wherein the first nearest neighbor core is to further process the first processed data.

11. The package of claim 10, wherein the at least some of the plurality of cores comprises a translation lookaside buffer (TLB) to map virtual addresses to physical addresses only for the local portion of the DRAM with a portion of address bits of an address space for the DRAM.

12. The package of claim 10, further comprising a third die comprising a second DRAM, the second DRAM comprising a plurality of second local portions, each of the plurality of second local portions comprising a third plurality of TSVs, wherein at least some of the plurality of cores are directly coupled to the corresponding second local portion of the second DRAM by interconnection of the first plurality of TSVs and the third plurality of TSVs.

13. The package of claim 12, wherein the second die comprises a cache memory and the third die comprises a system memory, when the package is implemented in a system lacking an external system memory.

\* \* \* \* \*